United States Patent
Lee et al.

[11] Patent Number: 5,978,453
[45] Date of Patent: Nov. 2, 1999

[54] METHOD AND APPARATUS FOR SWITCHING TO A MODEM IN A KEY TELEPHONE

[75] Inventors: In-Je Lee, Suwon; Jong-Won Kim, Kyungki-do, both of Rep. of Korea

[73] Assignee: SamSung Electronics Co., Ltd., Kyungki-do, Rep. of Korea

[21] Appl. No.: 08/829,135

[22] Filed: Mar. 28, 1997

[30] Foreign Application Priority Data

Mar. 28, 1996 [KR] Rep. of Korea .......................... 96/8882

[51] Int. Cl.⁶ ................................................. H04M 11/00
[52] U.S. Cl. .................... 379/93.01; 379/156; 379/93.09
[58] Field of Search .............. 379/93.01, 93.05, 379/93.09, 93.11, 156, 157

[56] References Cited

U.S. PATENT DOCUMENTS

| | | |
|---|---|---|
| 4,367,374 | 1/1983 | Serrano . |
| 4,596,021 | 6/1986 | Carter et al. . |
| 4,987,586 | 1/1991 | Gross et al. . |
| 5,003,580 | 3/1991 | Duong et al. ........................ 379/93.09 |
| 5,003,581 | 3/1991 | Pittard . |
| 5,014,299 | 5/1991 | Klupt et al. . |
| 5,018,189 | 5/1991 | Kurosawa . |
| 5,119,412 | 6/1992 | Attallah . |
| 5,202,915 | 4/1993 | Nishii . |
| 5,239,580 | 8/1993 | Bruno et al. . |
| 5,408,522 | 4/1995 | Ikehata et al. ........................ 379/93.14 |
| 5,428,671 | 6/1995 | Dykes et al. . |
| 5,440,619 | 8/1995 | Cann . |
| 5,444,770 | 8/1995 | Davis et al. ........................ 379/93.09 |
| 5,473,675 | 12/1995 | Chapman et al. . |
| 5,473,676 | 12/1995 | Frick et al. . |
| 5,475,691 | 12/1995 | Chapman et al. . |
| 5,493,609 | 2/1996 | Winseck, Jr. et al. . |
| 5,553,063 | 9/1996 | Dickson . |
| 5,592,538 | 1/1997 | Kosowsky et al. . |
| 5,606,599 | 2/1997 | O'Mahony et al. . |

FOREIGN PATENT DOCUMENTS

| | | |
|---|---|---|
| 0141911 A2 | 5/1985 | European Pat. Off. . |
| 0593116 A1 | 4/1994 | European Pat. Off. . |
| 35 31 173C2 | 1/1989 | Germany . |
| 2136246 | 9/1984 | United Kingdom . |
| WO 94/21077 | 9/1994 | WIPO . |

*Primary Examiner*—Paul Loomis
*Assistant Examiner*—Melur Ramakrishnah
*Attorney, Agent, or Firm*—Robert E. Bushnell, Esq.

[57] ABSTRACT

A method for switching a modem in a key telephone with a single communication line, wherein modem connection circuit is provided so as to use the single communication line as both a speech and a data path. Data communication is performed by using the single communication line without an extra data communication line.

12 Claims, 4 Drawing Sheets

METHOD AND APPARATUS FOR SWITCHING TO A MODEM IN A KEY TELEPHONE

CLAIM OF PRIORITY

This application makes reference to, incorporates the same herein, and claims all benefits accruing under 35 U.S.C. §119 arising from an application for Method For Switching to a Modem in a Key Telephone earlier filed in the Korean Industrial Property Office on Mar. 28, 1996 and there duly assigned Ser. No. 8882/1996.

FIELD OF THE INVENTION

The present invention concerns a method for switching to a modem in a key telephone, and more particularly a system for switching to a modem simply by operating a button without installing an extra line for using a modem in case of connecting with a modem while talking in a key telephone.

DESCRIPTION OF THE RELATED ART

The prior art contains many examples of where a single telephone line can be used for both voice and data communications. For example, U.S. Pat. No. 5,202,915 for a Single Line Communication Apparatus For Speech and Data and Method Therefor to Nishii, U.S. Pat. No. 5,014,299 for a Modem Coupler For Multi-Line Key Telephone System to Klupt et al., U.S. Pat. No. 4,596,021 for a Modem For Switching Between Voice and Data Communications on a Single Telephone Call to Carter et al. U.S. Pat. No. 5,606,599 for a Method and Apparatus For Automatically Converting From An Analog Voice Mode to a Simultaneous Voice and Data Mode For a Multi-Modal Call over a Telephone Line to O'Mahoney et al., U.S. Pat. No. 5,003,581 for a Telephone Line Priority Sharing Device to Pittard, U.S. Pat. No. 4,987,586 for a Modem-Telephone Interconnect to Gross et al. and U.S. Pat. No. 5,473,676 for a Telephone Handset Interface For Automatic Switching Between Voice and Data Communications to Frick et al. each disclose data and voice communications over a single telephone line. What is needed is a simplified system that allows the user to use the telephone line for either voice or for data communications.

SUMMARY OF THE INVENTION

It is an object of the present invention to provide a method and circuit for connecting a telephone line to a modem without using an extra line in a case of connecting to a modem when talking in a key phone.

According to the present invention, speech communication is carried normally and a current line is connected with a modem by operating an allocated function key of a key phone without another call for receiving a signal of modem in a case of requiring a modem connection when talking and the speech communication is resumed only by operating the function key by means of installing a common analog connection circuit for connecting a modem in a key phone when it is necessary to perform a data communication.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
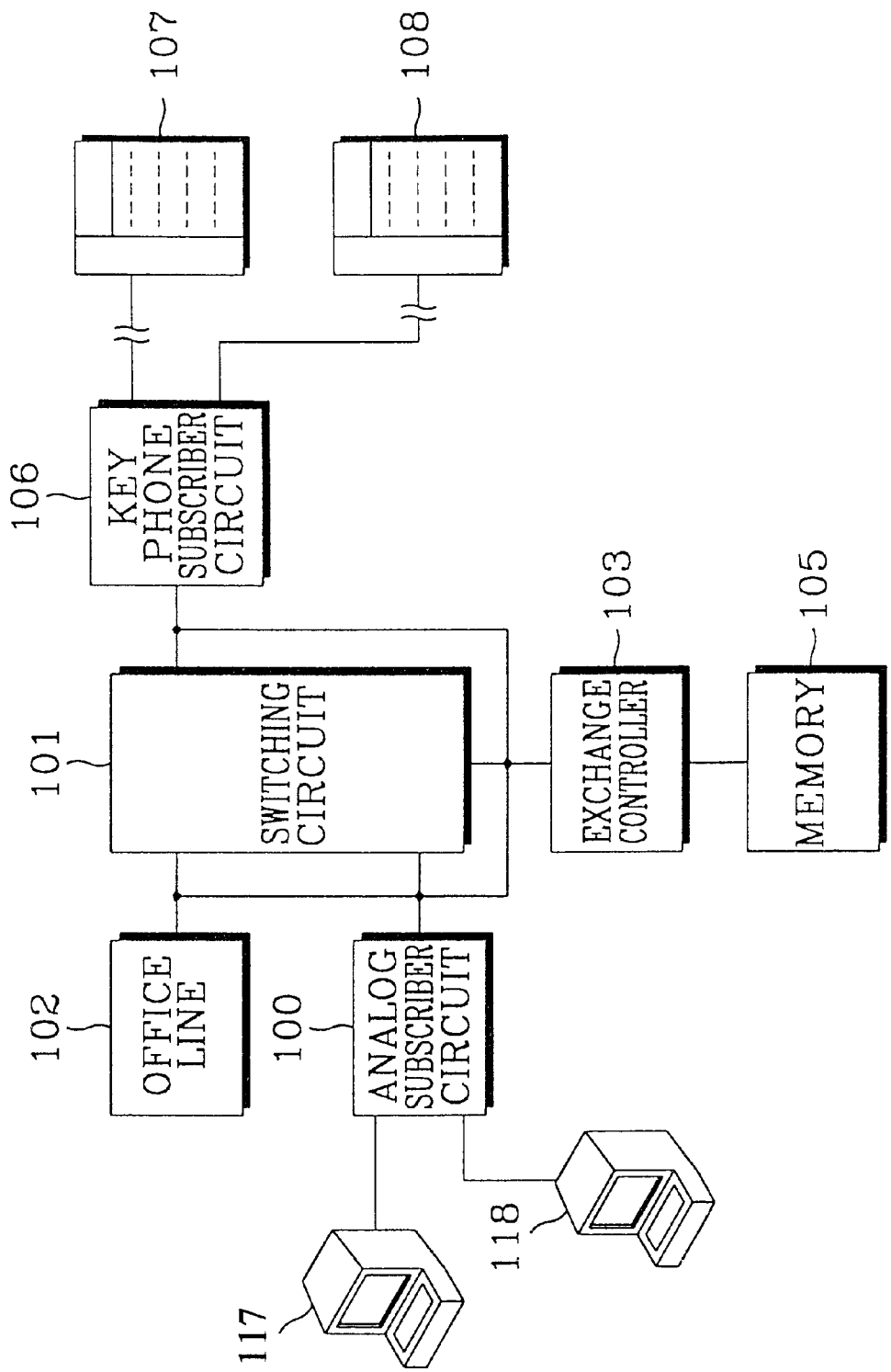
FIG. 1 illustrates a system of a conventional key telephone.

Referring to FIG. 1, two subscribers respectively using a key phone 107 and a key phone 108 transmit and receive a data from each other by establishing a line between personal computers 117 & 118 through each modem installed in the personal computers respectively in a case of the two subscribers' transmitting data to each other, where a line of a speech path is different from that of a data transmission. Therefore, there occurs a problem that a subscriber is unable to perform speech transmission and a data communication by using an allocated key phone line because of taking an extra line from a key phone for a modem.

Figure 2:
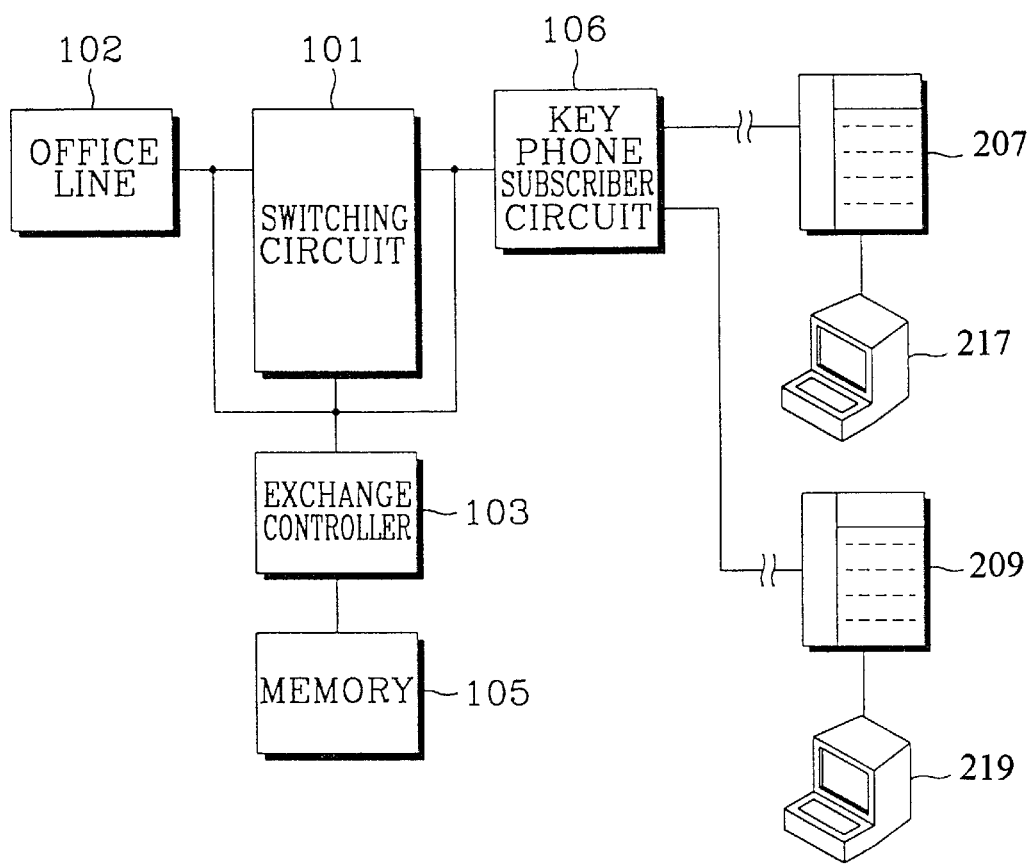
FIG. 2 illustrates a system of a key telephone according to the present invention.

Referring to FIG. 2, a key phone subscriber circuit 106 is connected with first key phone 207 and second key phone 209, of which each data transmission port is connected with each modem port of personal computer 217 and personal computer 219 respectively in a system configuring an office line 102, a switching circuit 101, an exchange controller 103 and a memory 105.

Figure 3:
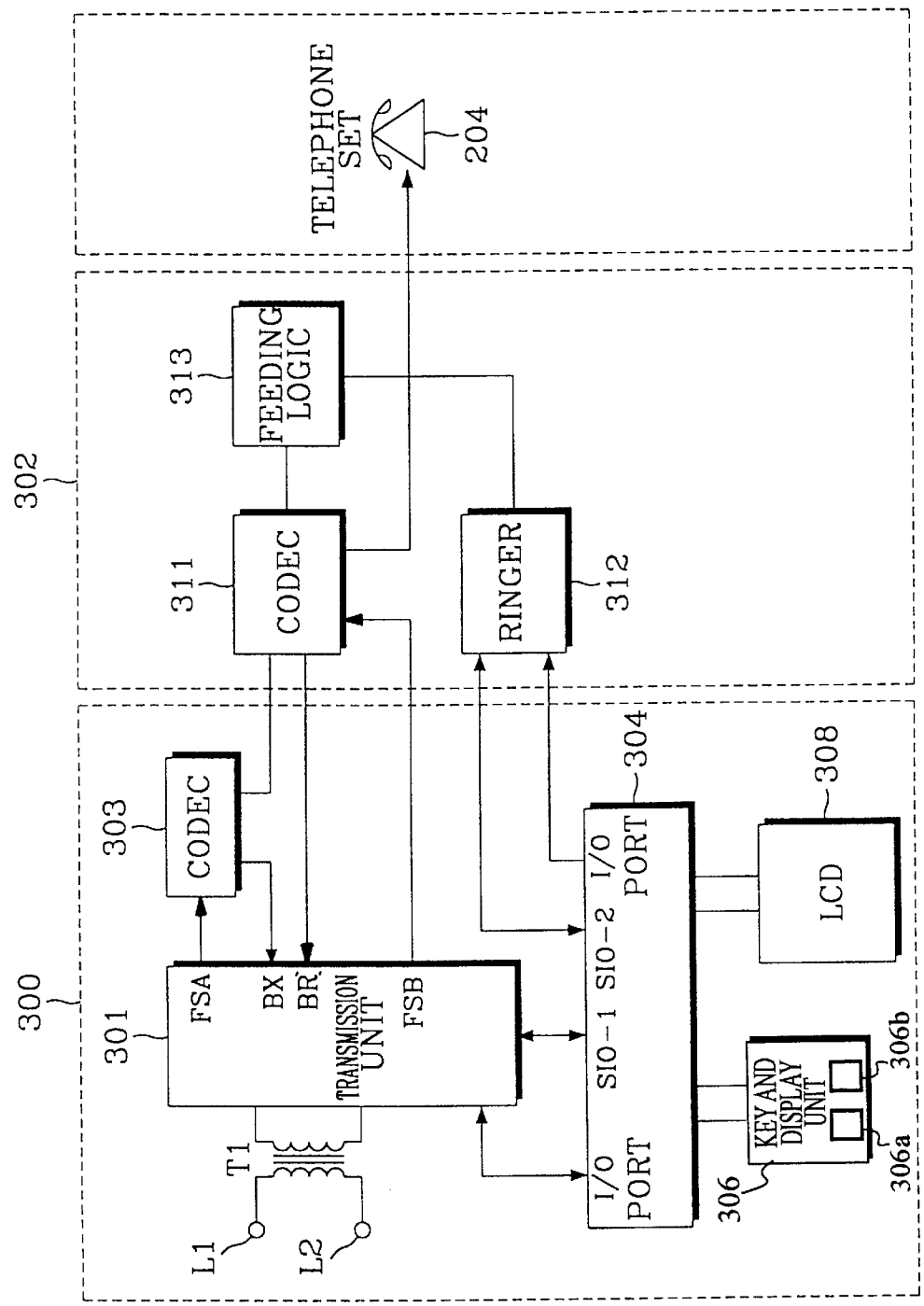
FIG. 3 is a connection diagram of a key telephone according to the present invention.

Referring to FIG. 3, a digital phone 300 of key phones 207 and 209, for example comprises a transmission unit 301 connected to transmission lines L1 & L2 and a transformer T1. Transmission unit 301 transmits information to codec 303 from pin FSA of transmission unit 301. Transmission unit 301 receives information from codec 303 through pin BX of transmission unit 301. The transmission unit 301 is connected with a main control 304 through an input/output and first series port SIO-1, and the main control 304 is connected with a key and display unit 306 and a LCD 308.

In a modem connection circuit 302, of key phones 207 and 209 a codec 311 is connected with the codec 303 and to pins BR and FSB of transmission unit 301 of the digital phone 300, and a ringer 312 is connected with SIO-2 pin and an I/O port on the main control 304. The codec 311 and a ringer 312 are connected with a feeding logic 313, and a telephone set 204 is connected with the codec 311.

Figure 4:
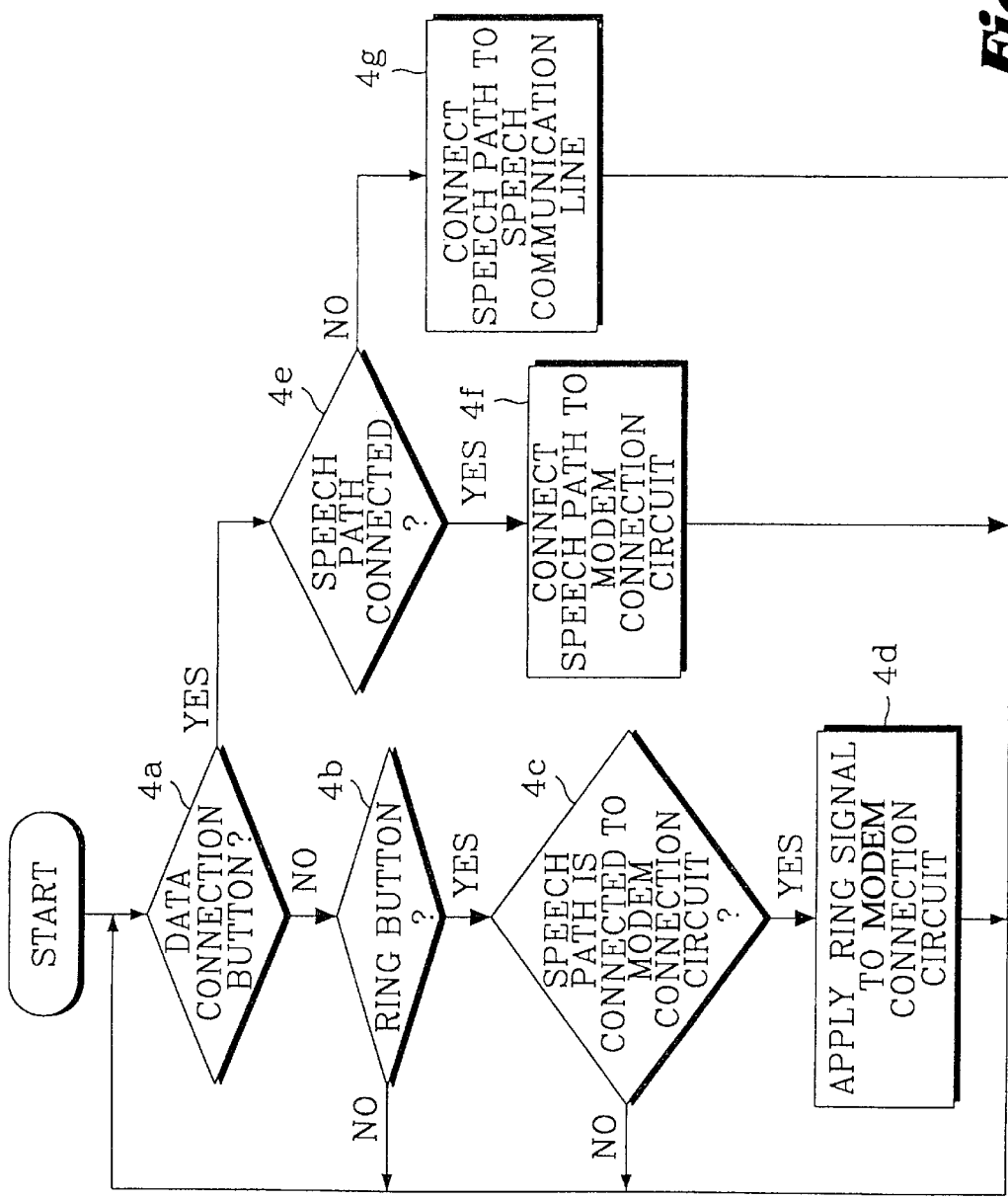
FIG. 4 is a flow chart according to the present invention.

Referring to FIGS. 2–4, the main control 304 checks an input of a data connection button 306a in a key input from the key & display unit 306 in step 4a, and checks a connection of a speech path through the transmission unit 301 in step 4e in a case of a key input existing in the step 4a. In case of a speech communication line existing in the step 4e, a speech path is connected with a modem connection circuit 302 as shown by step 4f, and in a case of a speech communication line is not existing, the speech path is connected with a common telephone set 204 as shown by step 4g.

The main control checks whether a ring button 306b is input or not in step 4b from a key & display unit 306 in case of a data connection button 306a being not input in the step 4a. The main control 304 applies a ring generating control signal to a modem connection circuit 302 for driving a ringer 312 for a predetermined time in step 4d in case of a speech path being connected with a modem connection circuit 302 by checking its existence in step 4c when there being an input of a ring button in the step 4b.

Data is transmitted from a modem of a personal computer 217 to personal computer 219 by operating a switch button of a key phone 207 resulting in driving a modem of the personal computer 217, and by operating a switch button of a key phone 209 and a ring drive button for receiving, the data thereby establishing a communication line between them. A voice/modem switch button, i.e. a data connection button, 306a, is pressed, a modem is connected to a speech path. When the ring button 306b is pressed, the ring button 306b sends a ring signal to the modem when a speech path of a key phone is connected to the modem. The two buttons are function keys in a key telephone.

According to the present invention, an extra subscriber line for receiving a modem is not necessary because modem connection circuits of key phones 207 & 209 are connected with modems of personal computers 217 & 219 respectively, and a data communication is performed quite freely simply by operating a switch button for selecting a voice line and a modem connection line and a ring button for giving a ring signal to a corresponding modem connection circuit in a key phone.

Referring to FIG. 4, operation of the system is as follows. First, it is determined whether or not a data connection button has been pressed. (step 4a) If the data connection button has been pressed, it is then determined whether a speech path is already in use. (step 4e) If the speech path is already in use, the speech path is connected to the modem connection circuit so that data transmission can be performed. (step 4f) If the speech path is not already in use, the speech path is connected to the speech communication line for voice communication. (step 4g)

If the data connection button is not pressed, it is determined whether or not the ring button is pressed. (step 4b) If the ring button is not pressed, the system loops back and a check is made, as before, as to whether the data connection button has been pressed. (step 4a) If, instead, the ring button is pressed, it is determined whether the speech path is connected to the modem connection circuit. (step 4c) If the speech path is connected to the modem connection circuit, a ring signal is applied to the modem connection circuit. (step 4d) If the speech path is not connected to the modem connection circuit, the process repeats and it is then checked, as before, if the data connection button has been pressed. (step 4a)

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method of performing data communication and voice communication using a key telephone and a single telephone line, comprising the steps of:

checking whether a data connection button of said key telephone has been pressed;

if said data connection button has been pressed, determining whether a speech path is already established;

if said speech path has already been established, connecting said speech path to a modem of a personal computer;

if said speech path has not already been established, connecting said speech path to a speech communication line, and if said data connection button of said key telephone has not been pressed;

checking whether a ring button of said key telephone has been pressed;

if said ring button has been pressed, checking whether said speech path is connected to said modem of said personal computer;

if said speech path is connected to said modem of said personal computer, applying a ring signal to said modem of said personal computer; and if one of (a) said ring button has not been pressed and (b) said speech path is not connected to said modem, determining whether said data connection button of said key telephone has been pressed.

2. A system for data communication using a key telephone, comprising:

a first key telephone for connection to a first personal computer, said first personal computer having a first modem connected thereto;

a second key telephone for connection to a second personal computer, said second personal computer having a second modem connected thereto; and a key phone subscriber circuit connected to both said first key telephone and said second key telephone, said key phone subscriber circuit providing access to said first modem and said second modem of said first personal computer and said second personal computer respectively for data communication between said first personal computer and said second personal computer, said first key telephone and said second key telephone each including a data connection button respectively providing selective connection of said first modem and said second modem to a speech path for said data communication between said first personal computer and said second personal computer in response to manual manipulation of a corresponding said data connection button.

3. The system of claim 2, further comprising:

a switching circuit connected to said key phone subscriber circuit;

an exchange controller connected to said switching circuit and said key phone subscriber circuit;

a memory connected to said exchange controller; and an office line connected to said switching circuit, said exchange controller, and said key phone subscriber circuit.

4. The system as claimed in claim 2, wherein said first key telephone and said second key telephone each have a ring button for respectively sending a ring signal to said first modem and to said second modem.

5. A system for data communication using a key telephone, comprising:

a key telephone;

a personal computer, said personal computer having a modem connected thereto; and a key phone subscriber circuit connected to said key telephone, said key phone subscriber circuit providing access to said modem of said personal computer for data communication using a speech path of said key telephone, said key telephone including a data connection button selectively providing connection of said modem to said speech path of said key telephone for said data communication in response to manual manipulation of said data connection botton.

6. The system of claim 5, wherein said key telephone includes a ring button, said ring button for sending a ring signal to said modem.

7. The system of claim 5, further comprising:

a switching circuit connected to said key phone subscriber circuit;

an exchange controller connected to said switching circuit and said key phone subscriber circuit;

a memory connected to said exchange controller; and an office line connected to said switching circuit, said exchange controller, and said key phone subscriber circuit.

8. A key telephone, comprising:

a transmission unit for transmitting and receiving information, said transmission unit for connection with a speech path of said key telephone;

a modem connection circuit for communication with said transmission unit and with a modem for data communication, said modem connection circuit for connection to said speech path of said key telephone;

a ring button, said ring button for sending a ring signal to said modem in response to manual manipulation of said ring button when said speech path of said key telephone is connected to said modem; and a data connection button selectively providing connection of said modem to said speech path of said key telephone for said data communication in response to manual manipulation of said data connection button.

9. The key telephone of claim 8, wherein said key telephone comprises a digital phone.

10. A system for data communication using a key telephone, comprising:

a first key telephone for connection to a first personal computer, said first personal computer having a first modem connected thereto;

a second key telephone for connection to a second personal computer, said second personal computer having a second modem connected thereto; and a key phone subscriber circuit connected to both said first key telephone and said second key telephone, said key phone subscriber circuit providing access to said first modem and said second modem of said first personal computer and said second personal computer respectively for data communication between said first personal computer and said second personal computer, said first key telephone and said second key telephone each including a ring button for respectively sending a ring signal to said first modem and to said second modem in response to manual manipulation of a corresponding said ring button.

11. A system for data communication using a key telephone, comprising:

a key telephone;

a personal computer, said personal computer having a modem connected thereto; and a key phone subscriber circuit connected to said key telephone, said key phone subscriber circuit providing access to said modem of said personal computer for data communication using a speech path of said key telephone, said key telephone including a ring button, said ring button for sending a ring signal to said modem in response to manual manipulation of said ring button.

12. The system of claim 11, wherein said ring button sends said ring signal to said modem when said speech path of said key telephone is connected to said modem.

* * * * *